United States Patent
Tripathi et al.

(10) Patent No.: US 11,275,772 B2
(45) Date of Patent: *Mar. 15, 2022

(54) METHOD AND SYSTEM FOR MANAGING NETWORK OF FIELD-SPECIFIC ENTITY RECORDS

(71) Applicant: Innoplexus AG, Eschborn (DE)

(72) Inventors: Gaurav Tripathi, Pune (IN); Vatsal Agarwal, Rampur (IN); Sudhanshu Shekhar, Patna (IN); Akshesh Doshi, Udaipur (IN)

(73) Assignee: Innoplexus AG, Eschborn (DE)

( * ) Notice: Subject to any disclaimer, the term of this patent is extended or adjusted under 35 U.S.C. 154(b) by 123 days.

This patent is subject to a terminal disclaimer.

(21) Appl. No.: 16/233,629

(22) Filed: Dec. 27, 2018

(65) Prior Publication Data
US 2019/0205318 A1 Jul. 4, 2019

(30) Foreign Application Priority Data
Dec. 30, 2017 (GB) ...................................... 1722304

(51) Int. Cl.
*G06F 16/28* (2019.01)
*G06F 16/951* (2019.01)
*G06F 16/2457* (2019.01)

(52) U.S. Cl.
CPC ...... *G06F 16/288* (2019.01); *G06F 16/24578* (2019.01); *G06F 16/951* (2019.01)

(58) Field of Classification Search
CPC . G06F 16/24578; G06F 16/288; G06F 16/951
See application file for complete search history.

(56) References Cited

U.S. PATENT DOCUMENTS

| | | | | |
|---|---|---|---|---|
| 9,342,624 | B1* | 5/2016 | Ojha | G06Q 50/01 |
| 2013/0304726 | A1* | 11/2013 | Sandulescu | G06Q 50/01 |
| | | | | 707/722 |
| 2015/0120713 | A1* | 4/2015 | Kim | G06F 16/9535 |
| | | | | 707/723 |
| 2018/0176803 | A1* | 6/2018 | Lee | H04W 24/08 |
| 2018/0196813 | A1* | 7/2018 | Lin | G06Q 50/01 |
| 2018/0341710 | A1* | 11/2018 | Liang | G06F 16/9535 |

* cited by examiner

*Primary Examiner* — Irete F Ehichioya
*Assistant Examiner* — Xiaoqin Hu
(74) *Attorney, Agent, or Firm* — Ziegler IP Law Group, LLC

(57) ABSTRACT

Disclosed is a method of managing a network of field-specific entity records. The method comprises accessing the network of field-specific entity records comprising at least one pair of field-specific entity records within at least one field segment, wherein the at least one pair of field-specific entity records is associated with relations therebetween, and wherein the at least one pair of field-specific entity records comprises a first pair of field-specific entity records and at least one second pair of field-specific entity records; determining a weightage score of each of the relations between the at least one pair of field-specific entity records; determining an importance score of each field-specific entity record; determining a change in the importance score, and/or the weightage score of a relation between field-specific entity records of the at least one second pair of field-specific entity records; and updating the network of field-specific entity records.

19 Claims, 2 Drawing Sheets

METHOD AND SYSTEM FOR MANAGING NETWORK OF FIELD-SPECIFIC ENTITY RECORDS

CROSS-REFERENCE TO RELATED APPLICATIONS

This application claims the benefit under 35 U.S.C. § 119(a) and 37 CFR § 1.55 to UK Patent Application No. GB1722304.1, filed on Dec. 30, 2017, the entire content of which is incorporated herein by reference.

TECHNICAL FIELD

The present disclosure relates generally to networking platforms; and more specifically, to methods and systems for managing networks of field-specific entity records. Moreover, the present disclosure also relates to computer readable medium containing program instructions for execution on a computer system, which when executed by a computer, cause the computer to perform method steps for managing network of field-specific entity records.

BACKGROUND

Generally, with advancement in technology, people are increasingly using web-based networking platforms to stay connected with each other. The web-based networking platforms (for example, social networks) are being used for a variety of purposes, including for personal reasons. For example, a person may use a social network for communicating and/or for staying in-touch with their friends and family members. Similarly, more and more people are using web-based networking platforms for professional purposes as well, including, for finding job opportunities, for finding other people who may be working in a same industry, connecting with influential people in the industry, and so forth.

Furthermore, dynamics associated with use of the professional web-based networking platforms for a user, can be vastly different from those associated with use of web-based networking platforms meant for personal interactions. For example, people that the user of the professional web-based networking platforms has in their network, may define how they are perceived by other people using the platform (or within their industry), the people that they can form a connection with, and generally, their overall success in using the platform for their professional benefit. Thus, it is essential for the person to know how each connection that they form with other people affects them and their network.

The conventional professional web-based networking platforms are associated with various drawbacks. For example, such platforms provide a user thereof with limited information about their network. Generally, such information does not include information about how one or more changes associated with the user can impact their network and vice-versa and/or their importance as perceived by other people within their network. Furthermore, the user may be required to input a substantial amount of effort to identify connections that can have a positive impact on their network and their professional status. Moreover, the user is not provided with information about how a change in their connections with various other users in the network can have effect their professional status. Consequently, the user is unable to form meaningful connections with important people in the industry, thus, inhibiting the user from taking optimal advantage of their professional network.

Therefore, in light of the foregoing discussion, there exists a need to overcome the aforementioned drawbacks associated with professional web-based networking platforms.

SUMMARY

The present disclosure seeks to provide a method of managing a network of field-specific entity records. The present disclosure also seeks to provide a system for managing a network of field-specific entity records. The present disclosure seeks to provide provides a computer readable medium, containing program instructions for execution on a computer system, which when executed by a computer, cause the computer to perform method steps for managing a network of field-specific entity records. The present disclosure seeks to provide a solution to the existing problem of identifying change in relations associated between various field-specific entities. An aim of the present disclosure is to provide a solution that overcomes at least partially the problems encountered in prior art, and provides an efficient and reliable method and system for managing the network of field-specific entity records.

In one aspect, an embodiment of the present disclosure provides a method of managing a network of field-specific entity records, wherein the method comprises:
a) accessing the network of field-specific entity records comprising at least one pair of field-specific entity records within at least one field segment, wherein the at least one pair of field-specific entity records is associated with relations between the at least one pair of field-specific entity records, and wherein the at least one pair of field-specific entity records comprises a first pair of field-specific entity records and at least one second pair of field-specific entity records;
b) determining a weightage score of each of the relations between the at least one pair of field-specific entity records;
c) determining an importance score of each field-specific entity record based on a plurality of entity attributes of the field-specific entity record and relations of the field-specific entity record with other field-specific entity records within at least one field segment;
d) determining a change in at least one of:
the importance score of a field-specific entity record of the first pair of field-specific entity records in the at least one field segment; and
the weightage score of a relation between the first pair of field-specific entity records in the at least one field segment;
e) determining a change in at least one of the importance score of a field-specific entity record and/or the weightage score of a relation between field-specific entity records of the at least one second pair of field-specific entity records, based on the determined change in at least one of the importance score of the field-specific entity record and/or the weightage score of the relation between the field-specific entity records of the first pair of field-specific entity records; and
f) updating the network of field-specific entity records based on the determined change in:
at least one of the importance score of the field-specific entity record and/or the weightage score of the relation between field-specific entity records of the first pair of field-specific entity records; and
at least one of the importance score of the field-specific entity record and/or the weightage score of the relation between field-specific entity records of the at least one second pair of field-specific entity records.

In another aspect, an embodiment of the present disclosure provides a system for managing a network of field-specific entity records, wherein the system comprises:

a processing module operable to:

accessing the network of field-specific entity records comprising at least one pair of field-specific entity records within at least one field segment, wherein the at least one pair of field-specific entity records is associated with relations between the at least one pair of field-specific entity records, and wherein the at least one pair of field-specific entity records comprises a first pair of field-specific entity records and at least one second pair of field-specific entity records;

determining a weightage score of each of the relations between the at least one pair of field-specific entity records;

determining an importance score of each field-specific entity record based on a plurality of entity attributes of the field-specific entity record and relations of the field-specific entity record with other field-specific entity records within at least one field segment;

determine a change in at least one of:

the importance score of a field-specific entity record of the first pair of field-specific entity records in the at least one field segment; and the weightage score of a relation between the first pair of field-specific entity records in the at least one field segment;

determine a change in at least one of the importance score of a field-specific entity record and/or the weightage score of a relation between field-specific entity records of the at least one second pair of field-specific entity records, based on the determined change in at least one of the importance score of the field-specific entity record and/or the weightage score of the relation between the field-specific entity records of the first pair of field-specific entity records; and update the network of field-specific entity records based on the determined change in:

at least one of the importance score of the field-specific entity record and/or the weightage score of the relation between field-specific entity records of the first pair of field-specific entity records; and at least one of the importance score of the field-specific entity record and/or the weightage score of the relation between field-specific entity records of the at least one second pair of field-specific entity records;

and a database arrangement communicably coupled with the processing module, wherein the database arrangement is operable to store the network of field-specific entity records.

In yet another aspect, an embodiment of the present disclosure provides a computer readable medium, containing program instructions for execution on a computer system, which when executed by a computer, cause the computer to perform method steps for managing a network of field-specific entity records, the method comprising the steps of:

a) accessing the network of field-specific entity records comprising at least one pair of field-specific entity records within at least one field segment, wherein the at least one pair of field-specific entity records is associated with relations between the at least one pair of field-specific entity records, and wherein the at least one pair of field-specific entity records comprises a first pair of field-specific entity records and at least one second pair of field-specific entity records;

b) determining a weightage score of each of the relations between the at least one pair of field-specific entity records;

c) determining an importance score of each field-specific entity record based on a plurality of entity attributes of the field-specific entity record and relations of the field-specific entity record with other field-specific entity records within at least one field segment;

d) determining a change in at least one of:

the importance score of a field-specific entity record of the first pair of field-specific entity records in the at least one field segment;

the weightage score of a relation between the first pair of field-specific entity records in the at least one field segment;

e) determining a change in at least one of the importance score of a field-specific entity record and/or the weightage score of a relation between field-specific entity records of the at least one second pair of field-specific entity records, based on the determined change in at least one of the importance score of the field-specific entity record and/or the weightage score of the relation between the field-specific entity records of the first pair of field-specific entity records; and f) updating the network of field-specific entity records based on the determined change in:

at least one of the importance score of the field-specific entity record and/or the weightage score of the relation between field-specific entity records of the first pair of field-specific entity records; and at least one of the importance score of the field-specific entity record and/or the weightage score of the relation between field-specific entity records of the at least one second pair of field-specific entity records.

Embodiments of the present disclosure substantially eliminate or at least partially address the aforementioned problems in the prior art, and provides effective, efficient and reliable method and system for managing a network of field-specific entity records.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1A:
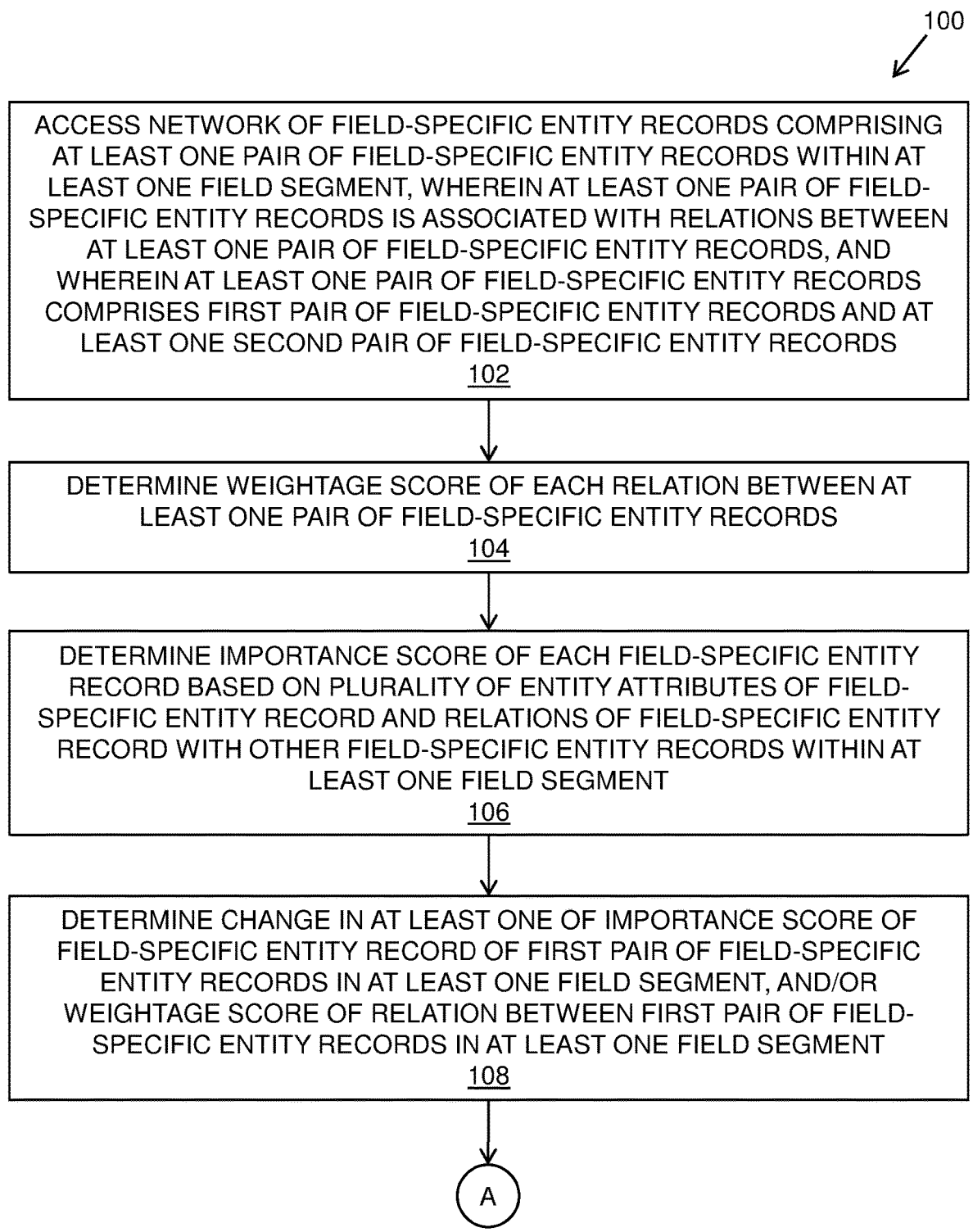
FIGS. 1A-B illustrate steps of a method of managing a network of field-specific entity records, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

In overview, embodiments of the present invention are concerned with methods and systems for managing networks of field-specific entity records. Furthermore, the present disclosure relates to software products recorded on machine-readable non-transient data storage media, wherein the software products are executable upon computing hardware to implement the aforesaid methods.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method of managing a network of field-specific entity records, the method comprising:
a) accessing the network of field-specific entity records comprising at least one pair of field-specific entity records within at least one field segment, wherein the at least one pair of field-specific entity records is associated with relations between the at least one pair of field-specific entity records; and wherein the at least one pair of field-specific entity records comprises a first pair of field-specific entity records and at least one second pair of field-specific entity records;
b) determining a weightage score of each of the relations between the at least one pair of field-specific entity records;
c) determining an importance score of each field-specific entity record based on a plurality of entity attributes of the field-specific entity record and relations of the field-specific entity record with other field-specific entity records within at least one field segment;
d) determining a change in at least one of:
the importance score of a field-specific entity record of the first pair of field-specific entity records in the at least one field segment;
the weightage score of a relation between the first pair of field-specific entity records in the at least one field segment;
e) determining a change in at least one of the importance score of a field-specific entity record and/or the weightage score of a relation between field-specific entity records of the at least one second pair of field-specific entity records, based on the determined change in at least one of the importance score of the field-specific entity record and/or the weightage score of the relation between the field-specific entity records of the first pair of field-specific entity records; and
f) updating the network of field-specific entity records based on the determined change in:
at least one of the importance score of the field-specific entity record and/or the weightage score of the relation between field-specific entity records of the first pair of field-specific entity records; and
at least one of the importance score of the field-specific entity record and/or the weightage score of the relation between field-specific entity records of the at least one second pair of field-specific entity records.

In another aspect, an embodiment of the present disclosure provides a system for managing a network of field-specific entity records, the system comprising:
a processing module operable to:
access the network of field-specific entity records comprising at least one pair of field-specific entity records within at least one field segment, wherein the at least one pair of field-specific entity records is associated with relations between the at least one pair of field-specific entity records; and wherein the at least one pair of field-specific entity records comprises a first pair of field-specific entity records and at least one second pair of field-specific entity records;
determine a weightage score of each of the relations between the at least one pair of field-specific entity records;
determine an importance score of each field-specific entity record based on a plurality of entity attributes of the field-specific entity record and relations of the field-specific entity record with other field-specific entity records within at least one field segment;
determine a change in at least one of:
the importance score of a field-specific entity record of the first pair of field-specific entity records in the at least one field segment;
the weightage score of a relation between the first pair of field-specific entity records in the at least one field segment;
determine a change in at least one of the importance score of a field-specific entity record and/or the weightage score of a relation between field-specific entity records of the at least one second pair of field-specific entity records, based on the determined change in at least one of the importance score of the field-specific entity record and/or the weightage score of the relation between the field-specific entity records of the first pair of field-specific entity records; and
update the network of field-specific entity records based on the determined change in:
at least one of the importance score of the field-specific entity record and/or the weightage score of the relation between field-specific entity records of the first pair of field-specific entity records; and
at least one of the importance score of the field-specific entity record and/or the weightage score of the relation between field-specific entity records of the at least one second pair of field-specific entity records;
and
a database arrangement communicably coupled with the processing module, wherein the database arrangement is operable to store the network of field-specific entity records.

The present disclosure provides a method and a system for managing the network of field-specific entity records. The method enables to determine the change in the network based on change in importance scores of various field-specific entity records associated with the user. Such a determination of the change in the network based on the importance score, enables the user to determine how the various field-specific entity records have an effect on their network, thus, enabling the user to take better control of their network. The method updates the network of the field-specific entity record based on the change in the relationships of the field-specific entity record with other field-specific entity records within at least one field segment. Thus, the method enables identification of the change in the relations between various field-specific entities efficiently. Such an identification of the change in the associations between various field-specific entities enables the user to determine how their relations with various field-specific entity records affect their network, thereby, enabling the user to enhance their network by enhancing (or forming) the relations with influential field-specific entity records. Furthermore, the impact score of the network is determined based on changes in importance score and/or the relationships of the field-specific entity record with various other field-specific entity records. Thus, it helps to determine how the network of the field-specific entity record is affected by changes with respect to one or more of the other field-specific entity records, thus, enabling reliable management of the network of the field-specific entity record. Additionally, the method eliminates substantial human intervention for such management of the network, thereby, reducing chances of inaccurate operation due to human error (and/or misleading results due to outdated results). Thus, the method enables robust and flexible management of the network of field-specific entity records. Furthermore, the system is simple and inexpensive.

Disclosed is the method of managing the network of field-specific entity records. Throughout the present disclosure, the term "entity" as used herein, relates to one or more persons, organizations, and so forth. For example, the entity may be a researcher, a market influencer, a company, a physician and suchlike. Such an entity may be an expert in a specific field of the industry. Throughout the present disclosure, the term "entity records" as used herein, relates to information retrieved from existing data sources. Specifically, the entity records are obtained by processing (namely, refining) the existing data sources. Furthermore, the existing data sources may be publicly available internet sources. For example, the existing data sources may include information from social networking sites, blogs, news, institutes, government agencies, market surveys and so forth. Moreover, the existing data sources may include organized or unorganized bodies of digital information regardless of manner in which data is represented therein. Specifically, when such digital information is related to the entities, the digital information is referred to as data-records. Furthermore, the extracted data-records are structured to obtain the entity records. The term "field" as used herein, refers to a domain or an area of expertise of each of the entity records. For example, the field may include medicine, pediatrics and so forth. Furthermore, the field of medicine may be associated with at least one field segment, such as, oncology, dermatology, orthopedics, and suchlike. Furthermore, entity records associated with a specific field segment may be referred to as "field-specific entity records". For example, an entity record of an entity "John" associated with the field segment "oncology" is the field-specific entity record for the field segment "oncology". It will be appreciated that, there may be multiple field-specific entity records within the field segment that may be associated with similar expertise.

The method comprises accessing the network of field-specific entity records comprising at least one pair of field-specific entity records within at least one field segment, wherein the at least one pair of field-specific entity records is associated with relations between the at least one pair of field-specific entity records, and wherein the at least one pair of field-specific entity records comprises a first pair of field-specific entity records and at least one second pair of field-specific entity records. Throughout the present disclosure, the term "network" as used herein, relates to an arrangement of interconnected field-specific entity records in at least one specific field segment. The network of the field-specific entity records may be accessed from various sources, including but not limited to, social networking websites, professional networking websites, employment websites (such as job boards), company websites, government websites, and so forth. For example, the network may be accessed from a pre-existing data record of employees working in an organization. Furthermore, the network will comprise information associated with employees (including employee names, identifications, positions held at the organization, number of years associated with the organization and so forth) and information about relations of various employees with each other. The term "relation" as used throughout the present disclosure, refers to an association between at least two field-specific entity records. For example, the relation between field-specific entity records may be defined by a number of publications co-authored together, number of inventions co-invented therebetween, number of years worked together, number of years studied together and so forth. Furthermore, such relations between the various field-specific entity records within at least one field segment can be identified, to determine the at least one pair of field-specific entity records. In a first example, a network may comprise a first, second and third field-specific entity records with entity names "Jake", "Neil", and "Joe" respectively associated with a field segment "Pediatrics", wherein each of the first, second and third field-specific entity records work in a same organization. Furthermore, the network may comprise the at least one pair of field-specific entity records between "Jake", "Neil", and "Joe". Such an at least one pair of field-specific entity records may comprise the first pair of field-specific entity records between "Jake" and "Neil", such that "Jake" may be working in a specific team of the organization and "Neil" may be a manager of the department comprising the team. Furthermore, "Joe" may be an intern working in the specific department of the organization. It will be appreciated that each of "Jake", "Neil", and "Joe" may have one or more additional relations with other field-specific entity records working in the same organization. Optionally, the network can be accessed by crawling one or more websites comprising the network of field-specific entity record.

Alternatively, the network of the field-specific entity records is generated. Optionally, the method comprises obtaining field-specific entity records comprising an entity name and a plurality of entity attributes, wherein each of the field-specific entity records is associated with at least one field segment. The field-specific entity records comprise entity names and a plurality of entity attributes associated with the entity names. Specifically, the term "entity name" relates to a subject of information included in the entity records. For example, the entity name may belong to one or more persons, organizations and so forth. The term "entity attributes" as used throughout the present disclosure, relates to information related to the entity name. The entity records include multiple fields of information about the entity name that comprise the plurality of entity attributes. In an example, the entity attribute includes data related to achievements of the entity in their field. In another example, the plurality of entity attributes may include information regarding correspondence address, academic background, birthdate, research work, publication works and so forth of the entity. In an example, a first entity record with an entity name "John" may comprise information such as name of the institute from where the entity has acquired education, publication details, research work, and correspondence address. Additionally, a second entity record with an entity name "Jessica" may comprise information such as name of the institute from where the entity has acquired education, publication details, research work, correspondence address, and birthdate as entity attributes.

Furthermore, the field (or the at least one field segment) of the entity record may be associated with at least one of the plurality of entity attributes of the entity record. In an example, an entity record for an entity name "John" may comprise entity attributes comprising information about academic background (such as a university that the entity may have graduated from) and a current organization of work of the entity. In such an example, the entity attribute comprising information about academic background of the entity may be "Stanford University, Department of Oncology" and the entity attribute comprising information about current organization of work of the entity may be "Centre for Cancer Research, National Cancer Institute". Consequently, the field of the entity may be "oncology", based on the aforementioned entity attributes of the entity record. Optionally, the entity records may be segmented into individual field segments. Optionally, the entity records may be extended to simultaneously occur in multiple field segments.

Optionally, a processing module is operable to obtain the field-specific entity records. Throughout the present disclosure, the term "processing module" as used herein, relates to a computational element that is operable to respond to and process instructions. Optionally, the processing module includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term processing module may refer to one or more individual processors, processing devices and various elements associated with a processing device that may be shared by other processing devices. Additionally, the one or more individual processors, processing devices and elements are arranged in various architectures for responding to and processing the instructions.

Optionally, obtaining the field-specific entity records comprises developing the structured database by crawling existing data sources to extract data-records. Furthermore, crawling the existing data sources may include extracting data from the available public or internal sources. Moreover, the available public sources may include information from profile made on social networking sites, blogs, news, institutes, market surveys and so forth. Furthermore, the crawled existing data sources may include information based on the research work or the publication data made available on the networking sites or several internal sources. Moreover, such data may also include information from the institute or company websites. Furthermore, the data-records refer to the information related to the entities. Moreover, the information in the data-records may include data in form of tables, maps, grids, packets, files, documents, lists or in any other form. However, the information may be included in multiple, scattered data-records. For example, the existing data sources may comprise information about a person with the name "John Lewis". Furthermore, the existing data sources may include more than one data-records for "John Lewis" that may be related to another person. Specifically, the data-records may have scattered, repetitive, inconsistent and/or missing values. In such an instance, the existing data sources are crawled to extract the data-records associated with such persons. Furthermore, the data-records may be further processed in order to obtain the data-records pertaining to such persons.

Optionally, the processing module comprises at least one crawler that is operable to extract entity records by crawling the existing data sources. Specifically, the existing data sources are associated with multiple sources of digital information that the entity records are extracted from. Furthermore, such digital information is required to be aggregated within the existing data sources. In such an instance, the processing module comprises at least one crawler that is operable to extract entity records by crawling the existing data sources. For example, the processing module is operable to crawl the existing data sources to extract the entity information therefrom. Optionally, the at least one crawler is implemented in a distributed architecture. Furthermore, when the at least one crawler is implemented in the distributed architecture, the programs (such as bots and/or web spiders) for browsing the existing data sources (such as World Wide Web) are configured to be hosted on one or more processing modules that are spatially separated from each other. Optionally, the entity records may be extracted in a tabular form subsequent to crawling the existing data sources. In such an instance, a first cell in a column of the table may include the entity name and remaining cells in the column may include the plurality of entity attributes associated with the entities.

Optionally, the structured database is developed by structuring the extracted data-records to obtain entity records, wherein each of the entity records comprises an entity name and plurality of entity attributes. Specifically, the structured database includes multiple entity records and each entity record would comprise the entity name (such as, denoting a name of the entity) and the plurality of entity attributes including, but not limited to, education qualifications, correspondence address, organization of work and the like. Furthermore, the extracted data-records are structured to obtain entity records. For example, a first data-record with an entity name "John Lewis" may comprise information such as name of the institute from where the entity has acquired education, and birthdate of the entity. Additionally, a second data-record with an entity name "John Lewis" may comprise information such as a birthdate and correspondence address thereof. Optionally, the structured database is developed by identifying a field of each of the entity records based on at least one of the plurality of entity attributes of the entity record. Specifically, the field of the entity records is identified by using the plurality of entity attributes. Thereby, a structured database is generated containing entity records in their identified specific fields. Optionally, the structured database is developed by segmenting the entity records into at least one field segment based on the field of the entity records, to identify the field-specific entity records. Moreover, the structured database may be developed to store the data-records related to various field-specific entities in an organized manner. Specifically, the structured database comprises field-specific entity records stored under respective field segments. In an example, entity records with entity names "Jonas", "Julia", "Mia", "Jessica" and "John" may be related to the fields "Oncology", "Pediatrics", "Oncology", "Dermatology" and "Pediatrics" respectively. Consequently, the entity records "Jonas" and "Mia" are segmented into a common field segment "Oncology" and the entity records are field-specific entity records for "Oncology". Similarly, the entity records, "Julia" and "Jessica" will be assigned to the field segment "Pediatrics" and the entity records are field-specific entity records for "Pediatrics". Thus, the plurality of the entity attributes may be similar for different entity records. Furthermore, the structured database includes all the data-records crawled from the existing data sources. Such data-records may be stored in an organized and uniform format, for example, as field-specific entity records.

Optionally, the method comprises identifying at least one pair of field-specific entity records having at least one similar entity attribute in each of the at least one field segments, wherein the at least one pair of field-specific entity records comprises a first pair of field-specific entity records and at least one second pair of field-specific entity records. The at least one pair of field-specific entity records may be identified between a pair of field-specific entity records within the at least one field segment. Furthermore, the pair of field-specific entity records may be identified based on at least one similar entity attribute therebetween. Specifically, a pair of entities having a common organization of work may have a similar entity attribute in the pair of entity records thereof. Therefore, such at least one pair of entity records may be identified based on at least one similar attribute. In the first example, the structured database may comprise the first, second and third field-specific entity records with entity names "Jake", "Neil", and "Joe" respectively. In such an example, the first and the second field-specific entities, "Jake" and "Neil" may have co-authored a research publication. Therefore, the first and the second field-specific entities may comprise data associated with the research publication as entity attributes therein. Subsequently in such example, the first and the second field-specific entity records may be identified as a first pair of field-specific entity records based on the similar entity attribute of the research publication. Furthermore, the second and third field-specific entities, "Neil" and "Joe" may be co-inventors of an invention related to a certain medical drug. Therefore, the second and the third field-specific entity records may comprise data associated with the invention related to the medical drug as entity attributes therein. Subsequently in such an example, the second and the third field-specific entity records may be identified as a second pair of field-specific entity records based on the similar entity attribute of the invention related to the medical drug. Similarly, the second field-specific entity "Neil" may form a third pair of field-specific entity records with a fourth field-specific entity "Jessica", based on a similar entity attribute of organization of work and a fourth pair of field-specific entity records with a fifth field-specific entity "Max", based on a similar entity attribute of academic background. Such a second pair, third pair and fourth pair of field-specific entity records form the at least one second pair of field-specific entity records.

Optionally, the method comprises generating the network of field-specific entity records by designating relations between the identified at least one pair of field-specific entity records. In the first example, the common organization of working of each of "Jake", "Neil", and "Joe" are designated as the relation therebetween, such as, the relation of "colleagues", "employment" or "career". Furthermore, "Jake" and "Neil" having co-authored the research publication, are designated the relation "co-authors" or "research". Similarly, "Neil" and "Joe" having co-invented the invention, are designated the relation "co-inventors" or "intellectual property".

The method comprises determining the weightage score of each of the relations between the at least one pair of field-specific entity records. Specifically, the term "weightage score" as used herein, relates to a strength of the relation between the at least one pair of field-specific entity records. Furthermore, the each of the at least one pair of field-specific entity records may be associated with one or more relations between the field-specific entity records. Moreover, the weightage score of each of the relations between the at least one pair of field-specific entity records is determined, such as, based on a nature of the relation between the pair, the similar attributes shared between the pair and the like. For example, the weightage score of the relation between the field-specific entity records of an at least one pair of field-specific entity records may be determined by a number of publications co-authored, number of research work done together (such as time spent together researching a particular topic), or inventions co-invented therebetween and so forth. Specifically, a higher number of publications co-authored, a higher amount of research work done together and/or a higher number of inventions co-invented between the pair of field-specific entity records, the higher is the weightage score of the relation therebetween. Furthermore, a higher number of similar entity attributes between the pair of fields-specific entity records, the higher is the weightage score of the relation therebetween. In the first example, the weightage score is determined for the relation between the first pair of field-specific entity records "Jake" and "Neil", based on a number of publications co-authored. In such an example, if the number of publications co-authored therebetween is four, the relation is assigned a higher weightage score as compared to if the number of publications co-authored therebetween is one.

The method comprises determining the importance score of each field-specific entity record based on the plurality of entity attributes of the field-specific entity record and relations of the field-specific entity record with other field-specific entity records within at least one field segment. Specifically, the term "importance score" as used throughout the present disclosure, relates to an individual score of the each field-specific entity record in the specific field segment. Furthermore, the importance score of each field-specific entity record is determined based on the plurality of entity attributes of the field-specific entity record and/or relations of the field-specific entity record with other field-specific entity records within the at least one field segment. The plurality of entity attributes of the field-specific entity record may be analyzed to determine significance thereof. Therefore, such a significance of the plurality of entity attributes may influence the importance score of the field-specific entity record. Moreover, the weightage score of the relations identified between the at least one pair of field-specific entity records may influence the importance score of each field-specific entity record of the at least one pair of field-specific entity records. Furthermore, a number of the relations of each field-specific entity record is determined. The number of designated relations and the weightage score of the designated relations between each field-specific entity record with other field-specific entity records are aggregated to determine the importance score of the field-specific entity record. It will be appreciated that a field-specific entity record with a higher number of relations with other field-specific entity records may have a higher importance score in comparison with a field-specific entity record with a lower number of relations. Furthermore, a field-specific entity record having relations with high weightage scores may have a higher importance score in comparison with a field-specific entity record having relations with low weightage scores. Moreover, a field-specific entity record having relations with other field-specific entity records associated with high importance scores, may have a higher importance score in comparison with a field-specific entity record having relations with other field-specific entity records associated with low importance scores. In the first example, the importance score of the first, second and third field-specific entity records with the entity names "Jake", "Neil" and "Joe" are determined. In such an example, determining the importance score of "Neil" would comprise aggregating the attribute-specific score of "Neil", the number of relations that "Neil" shares with each of "Jake" and "Joe", and the weightage score of each of those relations. Specifically, the determined importance score of "Neil" may provide an accurate estimation to understand an influence (namely, importance) of the field-specific entity record.

The method further comprises determining the net score of each field-specific entity record of the at least one pair of field-specific entity records based on the importance score of each field-specific entity record of the at least one pair of field-specific entity records; and the weightage score of each of the relations between the at least one pair of field-specific entity records. Specifically, the net score is obtained by analyzing the importance score and the weightage score of each field-specific entity record of at least one pair of field-specific entity records. In the first example, the net score for "Neil" is determined by aggregating the importance score thereof (determined based on the plurality of entity attributes thereof) and the weightage score of each of the relations of "Neil" in the first pair of the field-specific entity records (relations between the field-specific entity records "Jake" and "Neil") and the second pair of the field-specific entity records (relations between the field-specific entity records "Neil" and "Joe").

The method comprises determining the change in at least one of the importance score of a field-specific entity record of the first pair of field-specific entity records in the at least one field segment and/or the weightage score of a relation between the first pair of field-specific entity records in the at least one field segment. Specifically, the change in the importance score of the field-specific entity record depends on the change in one or more entity attributes of the field-specific entity record, an increase (or decrease) in the number of relations in the network of the field-specific entity record and/or an increase (or decrease) in the weightage score of a relation between the first pair of the field-specific entity records in the at least one field segment. In the first example, "Jake" may acquire an additional educational qualification from a top-tier college in a further specialization in a field of "Pediatrics". Therefore, such an additional educational qualification changes (for example, increases) the importance score of "Jake". Furthermore, the relation between "Jake" and "Neil" may be enhanced owing to increased number of publications co-authored by them. In such an instance, the weightage score of the relation between "Jake" and "Neil" increases due to such an increase in the number of co-authored publications. Alternatively, the relation between "Jake" and "Neil" may be dormant due to no additional work done therebetween. Furthermore, as the change in relations between each of the pair of field-specific entity records is reflected as the change in the weightage score, the weightage score of the relation remains the same when the relation between "Jake" and "Neil" is dormant.

In an example, the change in the importance score of "Jonas" and "Mia" within the field segment "Oncology" is determined. In another example, the change in importance score of "Julia" and "Jessica" within the field segment "Pediatrics" is determined. In such an example, the change will be reflected in the importance score of "Julia" when there is a significant rise in the number of relations established by the field-specific entity records with other field-specific entity records in the same field segment. Thus, a change will be reflected in the importance score of "Julia" on establishing an association with a primary field-specific entity record "Bob" having a higher importance score within the field segment "Pediatrics". However, a change may not be reflected in the importance score of "Julia" on establishing an association with "Jonas" associated with the field segment "Oncology".

The method comprises determining the change in at least one of the importance score of a field-specific entity record and/or the weightage score of a relation between field-specific entity records of the at least one second pair of field-specific entity records, based on the determined change in at least one of the importance score of the field-specific entity record and/or the weightage score of the relation between the field-specific entity records of the first pair of field-specific entity records. In a second example, the first pair of field-specific entity records is associated with entity names "Julia" and "Jessica" and the second pair of field-specific entity records is associated with entity names "Julia" and "Bob" in the field segment "Pediatrics". Furthermore, each of the field-specific entity records is associated with a predetermined importance score and each of the relations therebetween is associated with a particular weightage score. Furthermore, "Julia" may acquire additional educational qualifications. Therefore, there is an increase in the importance score of "Julia" of the first pair of field-specific entity records. However, "Julia" has a relation with both "Jessica" (of the first pair of field-specific entity records) and "Bob" (of the second pair of field-specific entity records). Therefore, the change in the importance score of "Julia" will be reflected in the weightage score of the relation thereof with each of "Jessica" and "Bob". Furthermore, "Julia" may have recently co-authored ten research publications with "Jessica" in the field segment "Pediatrics". Therefore, there will be an increase in the weightage score of the relation between "Julia" and "Jessica". Furthermore, the importance scores of "Julia" and "Jessica" increases based on the increase in the number of research publications authored by each of them. Such a change in the importance score of "Julia" of the first pair of field-specific entity records results in the change in the importance score of "Bob" associated with the second pair of field-specific entity records. Therefore, the change in the importance score of the field-specific entity record and/or the weightage score of the relation between the first pair of the field-specific entity records is reflected as the change in the importance score of the field-specific entity records and/or weightage score of the second pair of the field-specific entity records.

Optionally, the method further comprises determining a change in the net score of each field-specific entity record of the at least one pair of field-specific entity records. Furthermore, the change in the net score is obtained by analyzing the change in the importance score of the field-specific entity record of the at least one pair of field-specific entity records and/or the change in the weightage score of relations between the at least one pair of field-specific entity records in the at least one field segment. In the second example, the change in the net score for "Julia" is determined by aggregating the change in the importance score thereof that is determined based on the additional educational qualification acquired by "Julia"; and the change in the weightage scores of the relations thereof with each of "Jessica" and "Bob". Thus, the change in the importance score and the weightage score reflect an increase in the net score for "Julia". Furthermore, the net score of "Jessica", only having co-authored ten research publications with "Julia" in the field segment "Pediatrics", will reflect lower change (or increase) as compared to the change in net score of "Julia".

Optionally, the determined change in the net score is used to identify at least one of a positive growth and/or a negative growth of each field-specific entity record. Specifically, an increase in the net score reflects a positive growth of the field-specific entity record. Alternatively, a decrease in the net score reflects a negative growth of the field-specific entity record. In the second example, net scores associated with each of "Julia", "Jessica" and "Bob" reflect the positive growth based on the corresponding increase in the net scores thereof. Thus, the positive growth of "Julia" (for example, within a specific time period) may be determined to be more than that of "Jessica" and/or "Bob". Furthermore, "Bob" may have a relation with "Jason", wherein the importance score of "Jason" decreases in the specific field segment. Consequently, the net score of "Bob" decreases (based on a decrease in the weightage score of the relation thereof with "Jason") and thus, the decrease in the net score of "Bob" reflects the negative growth.

Optionally the method further comprises determining an impact score of the network of field-specific entity records based on the determined change in the net score of each field-specific entity record. Specifically, the change in the net score of field-specific entity records forming the at least one pair of field-specific entity records with a field-specific entity record, reflects a change (such as a positive or negative change) in the overall network of the field-specific entity record. Such a change in the network of the field-specific entity record is the impact score of the network of the field-specific entity record. In a third example, a first, second, third and fourth field-specific entity records with entity names "James", "Bill", "Tom", and "Johnny" respectively, may be associated with predetermined importance scores in the field segment "Oncology". Furthermore, "James" may have co-authored ten publications with "Johnny". Moreover, "Bill" and "Johnny" may have co-invented a medicinal drug related to treatment of cancer. Additionally, "Bill" may be working in a same department of a drug development company with "Tom". Furthermore, the weightage score of the relations between each of the pair of field-specific entity records is determined. Moreover, a network of the field-specific entity records is generated by designating the relations between the each of the pair of field-specific entity records. Additionally, a net score of each field-specific entity record is determined based on the determined importance score of each field-specific entity record and the weightage scores of the relations between the each pair of field-specific entity records. Furthermore, the net score of one or more of field-specific entity record may change based on a change in the importance score of a field-specific entity record and/or a change in the weightage score of the relations between the at least one pair of field-specific entity records. Subsequently, an impact score is calculated of the network of the field-specific entity records by determining such a change in the net score.

The method comprises updating the network of field-specific entity records based on the determined change in at least one of the importance score of the field-specific entity record and/or the weightage score of the relation between field-specific entity records of the first pair of field-specific entity records; and at least one of the importance score of the field-specific entity record and/or the weightage score of the relation between field-specific entity records of the at least one second pair of field-specific entity records. In the third example, the first field-specific entity record "James" establishes a new relation with the second field-specific entity record "Bill", such as, by co-authoring a research paper in the specific field segment. Furthermore, the new relation will affect the importance score of both "James" and "Bill". Moreover, the change in the importance score of "James" and "Bill" is determined based on the weightage score of the new relation established therebetween. Additionally, the change in the weightage scores of each of the relations associated with "James" and "Bill" is determined, based on the determined change in the importance scores of "James" and "Bill". Furthermore, a change in the net score of each of "James", "Bill", "Tom", and "Johnny" is determined based on the change in at least one of the importance score thereof, and/or the weightage score of the relation between each pair of field-specific entity records formed by "James", "Bill", "Tom", and "Johnny". Moreover, the impact score of the network is calculated based on the determined change in the net scores of "James", "Bill", "Tom", and "Johnny". Furthermore, the network is updated based on the determined change in at least one of the importance score of "James", "Bill", "Tom", and "Johnny" and/or the weightage score of each of the relations between "James", "Bill", "Tom", and "Johnny". Optionally, a database arrangement is communicably coupled with the processing module, wherein the database arrangement is operable to store the network of field-specific entity records. The database arrangement may store the network of field-specific entities in an organized manner. Throughout the present disclosure, the term "database arrangement" as used herein, relates to an organized body of digital information regardless of a manner in which the data or the organized body thereof is represented. Optionally, the database arrangement may be hardware, software, firmware and/or any combination thereof. For example, the organized body of digital information may be in a form of a table, a map, a grid, a packet, a datagram, a file, a document, a list or in any other form. The database arrangement includes any data storage software and system, such as, for example, a relational database like IBM DB2 and Oracle 9. Furthermore, the data storage software and system may include MongoDB, HBase, ElasticSearch, Neo4J, ArangoDB and so forth. Additionally, the database arrangement refers to a software program for creating and managing one or more databases. Optionally, the database arrangement may be operable to support relational operations, regardless of whether it enforces strict adherence to the relational model, as understood by those of ordinary skill in the art.

Beneficially, the database arrangement is communicatively coupled to the processing module using a communication module. Throughout the present disclosure, the term "communication module" as used herein, relates to an arrangement of interconnected programmable and/or non-programmable components that are configured to facilitate data communication between one or more electronic devices, software modules and/or databases, whether available or known at the time of filing or as later developed. Additionally, the communication module employs wired or wireless communication that can be carried out via any number of known protocols. Moreover, the communication module is operable to access the database arrangement and communicate the accessed data to the processing module. Consequently, the coupling of processing module and communication module enables exchange of data between the database arrangement and the processing module. For example, the network of field-specific entity records stored in the database arrangement is accessible to the processing module via the communication module.

Optionally, the method further comprises receiving a user-input from a user, wherein the user-input is associated with the determined change in at least one of the importance score of the field-specific entity record and/or the weightage score of the relation between the first pair of field-specific entity records. For example, the user-input may be obtained from the user in a form of a text input, a selection of an option, a graphical input and so forth corresponding to the change. Specifically, the user-input may be used to infer (namely, anticipate) the change in the network of the field-specific entity record based on the change in the importance score of any field-specific entity record in the network and/or the weightage score of any relation between a pair of the field-specific entity records in the network. In an example the user-input may be associated with the change in the entity attribute related to the number of research publications authored by the field-specific entity record. Such a user-input will result in the change in the importance score of the field-specific entity record. Additionally, the change in weightage score of various relations of the field-specific entity record with other field-specific entity records in the network is determined, based on the change in the importance score of the field-specific entity record. Moreover, a change in the net score of each field-specific entity record in the network is determined based on the change in the importance score and/or the weightage score of relations of the field-specific entity record and consequently, an impact score of the network is determined based on the change in the net score. Such an impact score enables the user to determine how the network will change, based on the change in the number of research publications authored by the field-specific entity record. Furthermore, the field-specific entity record may choose to author one or more research publications to maintain (or increase) the importance score associated therewith. Moreover, the user may choose to enhance (or form) one or more relations with other field-specific entity records to maintain (or increase) the weightage score of the relation, thereby, enabling the user to maintain (or increase) their net score.

Optionally, the method further comprises generating a list of field-specific entity records having the importance score above a predefined threshold in a specific field segment. For example, the field-specific entity records having the importance score above the predefined threshold may be the primary field-specific entities within the specific field segment. Such primary field-specific entities may be researchers, market influencers, companies, physicians and suchlike having a well-established level of expertise (such as, an expert) within the specific field segment. The primary field-specific entity may play a key role in developing, launching and/or promoting a new service or product by providing their expertise. In an example, the list is generated by aggregating top 500 primary field-specific entity records within a specific field segment.

Optionally, the method further comprises modifying the generated list of field-specific entity records in the specific field segment. Such a modification of the list of field-specific entity records may be performed by addition of at least one incipient field-specific entity record within the specific field segment to the list of field-specific entity records. The incipient field-specific entity record may be associated with a field-specific entity in a nascent stage, such that, the field-specific entity has a potential to become the primary field-specific entity within the specific field segment in a subsequent time. Such incipient field-specific entities may be easily accessible for providing their expertise (such as, for developing, launching and/or promoting a new service or product) to a user (such as a company looking to develop, launch and/or promote the new service or product) as compared to the primary field-specific entities. Furthermore, the importance score of the at least one incipient field-specific entity record may change in the specific field segment (in the subsequent time) such that the importance score of the incipient field-specific entity record is more than the importance score of one or more primary field-specific entity records in the list. In such an instance, the list may be modified to add the at least one incipient field-specific entity record thereto. Optionally, the list may be modified by removing the primary field-specific entity record having the importance score less than the at least one incipient field-specific entity record, from the list of field-specific entity records in the specific field segment. In the third example, the predefined threshold of importance score for generating the list of field-specific entity records for the specific field segment of "Oncology" is 100. Furthermore, "James", "Bill", "Tom", and "Johnny" are associated with importance scores of 102, 105, 111 and 98 respectively. In such an example, the list of field-specific entity records for the specific field segment of "Oncology" may comprise field-specific entity records associated with each of "James", "Bill" and "Tom". However, the list may not comprise the field-specific entity record "Johnny", who is associated with the importance score of 98 (less than the predefined threshold). Moreover, the change in the importance score of "Johnny" may be associated with an increase thereof from 98 to 103. In such an instance, the field-specific entity record associated with "Johnny" may be added to the list of field-specific entity records for the specific field segment of "Oncology". Optionally, the field-specific entity record associated with "James", having the importance score less than that of "Johnny" may be removed from the list.

In operation, a network of field-specific entity records associated with entities with entity names "Jonas", "Julia", "Jessica" and "Mia" is accessed. Furthermore, the field-specific entity records are associated with a specific field segment of "Pediatrics", such that each of the field-specific entity records are associated with entities working in a same organization of work. It will be appreciated that that the network can comprise additional field-specific entity records having relations with one or more of "Jonas", "Julia", "Jessica" and "Mia" respectively. Furthermore, a weightage score of each of the relations between the various pairs of field-specific entity records are determined and subsequently, an importance score is determined for each of the field-specific entity records "Jonas", "Julia", "Jessica" and "Mia". Thereafter, "Jonas" is promoted to a higher position in the organization of work and thus, an increase in reflected in the importance score thereof. Consequently, weightage scores of relations with "Jonas", of each of "Julia", "Jessica" and "Mia" changes due to such an increase in the importance score of "Jonas". Furthermore, such an increase in the weightage scores of relations increases the importance scores associated with each of "Julia", "Jessica" and "Mia". Alternatively, "Jonas" and "Julia" co-author a new research paper in the field segment of "Pediatrics" and the research paper gets published in a well-established publication in the field segment of "Pediatrics". In such an instance, the importance score of each of "Jonas" and "Julia" increases and furthermore, the weightage score of a pre-existing relation of "co-authorship" therebetween increases. Consequently, importance scores of "Jessica" and "Mia" increase due to increase in each of the importance score of "Jonas", the importance score of "Julia", and the weightage score of the relation between "Jonas" and "Julia". Thereafter, the network is updated to reflect the various changes in the importance and the weightage scores. Optionally, a positive change is reflected in the impact score of the network.

Disclosed is a system for managing a network of field-specific entity records. The system comprises a processing module operable to access the network of field-specific entity records comprising at least one pair of field-specific entity records within at least one field segment, wherein the at least one pair of field-specific entity records is associated with relations between the at least one pair of field-specific entity records, and wherein the at least one pair of field-specific entity records comprises a first pair of field-specific entity records and at least one second pair of field-specific entity records; determine a weightage score of each of the relations between the at least one pair of field-specific entity records; and determine an importance score of each field-specific entity record based on a plurality of entity attributes of the field-specific entity record and relations of the field-specific entity record with other field-specific entity records within at least one field segment. Furthermore, the processing module is operable to determine a change in at least one of the importance score of a field-specific entity record of the first pair of field-specific entity records in the at least one field segment; the weightage score of a relation between the first pair of field-specific entity records in the at least one field segment. Moreover, the processing module is operable to determine a change in at least one of the importance score of a field-specific entity record and/or the weightage score of a relation between field-specific entity records of the at least one second pair of field-specific entity records, based on the determined change in at least one of the importance score of the field-specific entity record and/or the weightage score of the relation between the field-specific entity records of the first pair of field-specific entity records; and update the network of field-specific entity records based on the determined change in at least one of the importance score of the field-specific entity record and/or the weightage score of the relation between field-specific entity records of the first pair of field-specific entity records; and at least one of the importance score of the field-specific entity record and/or the weightage score of the relation between field-specific entity records of the at least one second pair of field-specific entity records. Furthermore, the system for managing a network of field-specific entity records comprises a database arrangement communicably coupled with the processing module, wherein the database arrangement is operable to store the network of field-specific entity records.

Optionally, the processing module is further operable to obtain field-specific entity records comprising an entity name and the plurality of entity attributes, wherein each of the field-specific entity records is associated with at least one field segment; identify at least one pair of field-specific entity records having at least one similar entity attribute in each of the at least one field segments; and generate the network of field-specific entity records by designating relations between the identified at least one pair of field-specific entity records.

Optionally, the processing module is further operable to develop a structured database by crawling existing data sources to extract data-records; structuring the extracted data-records to obtain entity records, wherein each of the entity records comprises an entity name and plurality of entity attributes; identifying a field of each of the entity records based on at least one of the plurality of entity attributes of the entity record; and segmenting the entity records into one or more field segments based on the field of the entity records, to identify the field-specific entity records. Optionally, the processing module comprises at least one crawler that is operable to extract entity records by crawling the existing data sources. Optionally, the at least one crawler is implemented using a distributed architecture.

Optionally, the processing module is further operable to receive a user-input from a user, wherein the user-input is associated with the determined change in at least one of the importance score of the field-specific entity record and/or the weightage score of the relation between the first pair of field-specific entity records. Optionally, the processing module is further operable to determine a net score of each field-specific entity record of the at least one pair of field-specific entity records, based on the importance score of each field-specific entity record of the at least one pair of field-specific entity records; the weightage score of each of the relations between the at least one pair of field-specific entity records.

Optionally, the processing module is further operable to determine a change in the net score of each field-specific entity record of the at least one pair of field-specific entity records. Optionally, the processing module is further operable to use the determined change in the net score to identify at least one of a positive growth and/or a negative growth of each field-specific entity record. Optionally, the processing module is further operable to determine an impact score of the network of field-specific entity records based on the determined change in the net score of each field-specific entity record.

Furthermore, there is disclosed a computer readable medium, containing program instructions for execution on a computer system, which when executed by a computer, cause the computer to perform method steps for managing a network of field-specific entity records. The method comprising the steps of accessing the network of field-specific entity records comprising at least one pair of field-specific entity records within at least one field segment, wherein the at least one pair of field-specific entity records is associated with relations between the at least one pair of field-specific entity records, and wherein the at least one pair of field-specific entity records comprises a first pair of field-specific entity records and at least one second pair of field-specific entity records; determining a weightage score of each of the relations between the at least one pair of field-specific entity records; determining an importance score of each field-specific entity record based on a plurality of entity attributes of the field-specific entity record and relations of the field-specific entity record with other field-specific entity records within at least one field segment; determining a change in at least one of: the importance score of a field-specific entity record of the first pair of field-specific entity records in the at least one field segment, the weightage score of a relation between the first pair of field-specific entity records in the at least one field segment; determining a change in at least one of the importance score of a field-specific entity record and/or the weightage score of a relation between field-specific entity records of the at least one second pair of field-specific entity records, based on the determined change in at least one of the importance score of the field-specific entity record and/or the weightage score of the relation between the field-specific entity records of the first pair of field-specific entity records; and updating the network of field-specific entity records based on the determined change in: at least one of the importance score of the field-specific entity record and/or the weightage score of the relation between field-specific entity records of the first pair of field-specific entity records, and at least one of the importance score of the field-specific entity record and/or the weightage score of the relation between field-specific entity records of the at least one second pair of field-specific entity records.

Optionally, the machine-readable non-transient data storage media comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Figure 1B:
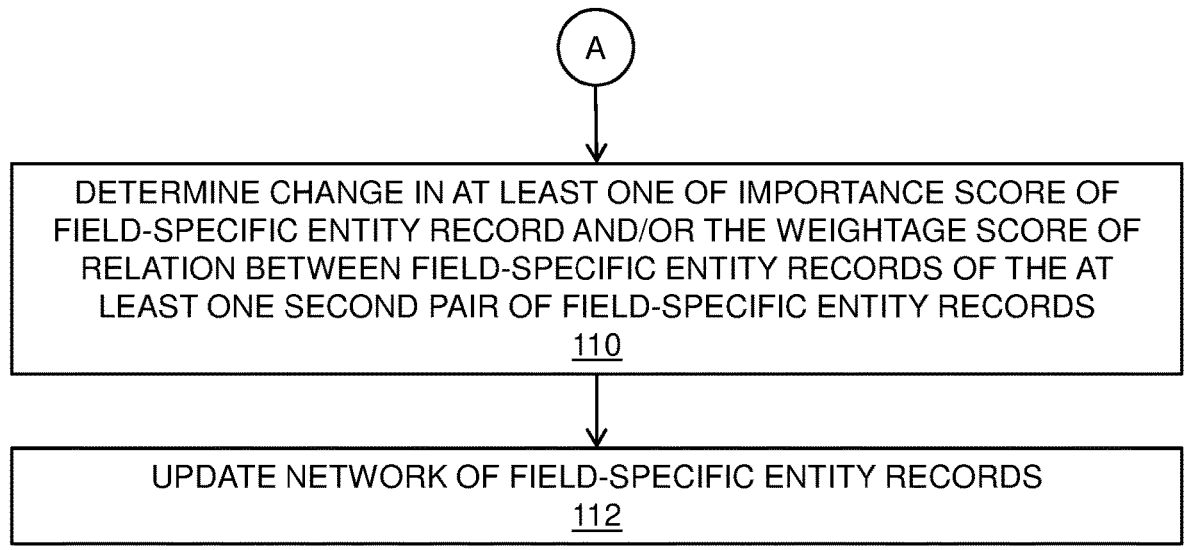

Referring to FIGS. 1A-B, there are shown steps of a method 100 of managing a network of field-specific entity records, in accordance with an embodiment of the present disclosure. At a step 102, the network of field-specific entity records comprising at least one pair of field-specific entity records within at least one field segment is accessed, wherein the at least one pair of field-specific entity records is associated with relations between the at least one pair of field-specific entity records, and wherein the at least one pair of field-specific entity records comprises a first pair of field-specific entity records and at least one second pair of field-specific entity records. At a step 104, a weightage score of each of the relations between the at least one pair of field-specific entity records is determined. At a step 106, an importance score of each field-specific entity record is determined based on a plurality of entity attributes of the field-specific entity record and relations of the field-specific entity record with other field-specific entity records within at least one field segment. At a step 108 a change in at least one of the importance score of a field-specific entity record of the first pair of field-specific entity records in the at least one field segment, and/or the weightage score of a relation between the first pair of field-specific entity records in the at least one field segment is determined. At a step 110, a change in at least one of the importance score of a field-specific entity record and/or the weightage score of a relation between field-specific entity records of the at least one second pair of field-specific entity records is determined, based on the determined change in at least one of the importance score of the field-specific entity record and/or the weightage score of the relation between the field-specific entity records of the first pair of field-specific entity records. At a step 112, the network of field-specific entity records is updated based on the determined change in at least one of the importance score of the field-specific entity record and/or the weightage score of the relation between field-specific entity records of the first pair of field-specific entity records, and the determined change in at least one of the importance score of the field-specific entity record and/or the weightage score of the relation between field-specific entity records of the at least one second pair of field-specific entity records.

The steps 102 to 112 are only illustrative and other alternatives can also be provided where one or more steps are added, one or more steps are removed, or one or more steps are provided in a different sequence without departing from the scope of the claims herein. In an example, the method 100 further comprises obtaining field-specific entity records comprising an entity name and the plurality of entity attributes, wherein each of the field-specific entity records is associated with at least one field segment; identifying at least one pair of field-specific entity records having at least one similar entity attribute in each of the at least one field segments; and generating the network of field-specific entity records by designating relations between the identified at least one pair of field-specific entity records. In another example, obtaining the field-specific entity records comprises developing a structured database by crawling existing data sources to extract data-records; structuring the extracted data-records to obtain entity records, wherein each of the entity records comprises an entity name and plurality of entity attributes; identifying a field of each of the entity records based on at least one of the plurality of entity attributes of the entity record; and segmenting the entity records into at least one field segment based on the field of the entity records, to identify field-specific entity records. In another example, the method 100 further comprises receiving a user-input from a user, wherein the user-input is associated with the determined change in at least one of the importance score of the field-specific entity record and/or the weightage score of the relation between the first pair of field-specific entity records. In yet another example, the method 100 further comprises determining a net score of each field-specific entity record of the at least one pair of field-specific entity records based on the importance score of each field-specific entity record of the at least one pair of field-specific entity records; and the weightage score of each of the relations between the at least one pair of field-specific entity records.

In one example, the method 100 further comprises determining a change in the net score of each field-specific entity record of the at least one pair of field-specific entity records. In another example, the determined change in the net score is used to identify at least one of a positive growth and/or a negative growth of each field-specific entity record. In yet another example, the method 100 further comprises determining an impact score of the network of field-specific entity records based on the determined change in the net score of each field-specific entity record.

Figure 2:
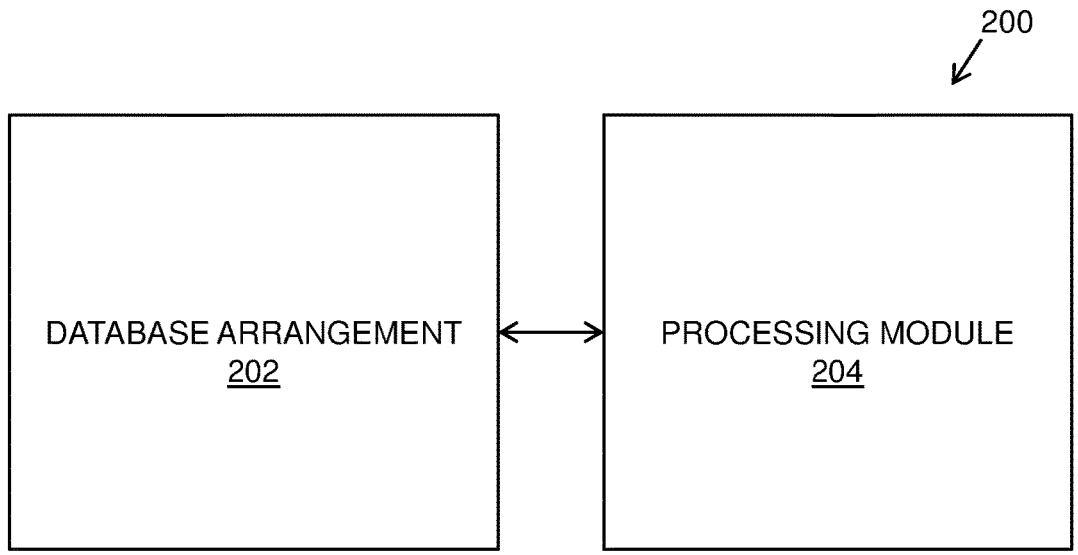
FIG. 2 is a block diagram of a system for managing a network of field-specific entity records, in accordance with an embodiment of the present disclosure.

Referring to FIG. 2, there is shown a block diagram of a system 200 for managing a network of field-specific entity records, in accordance with an embodiment of the present disclosure. The system 200 comprises a database arrangement 202 operable to store the network of field-specific entity records. Furthermore, the system 200 comprises a processing module 204 communicably coupled to the database arrangement 202. Optionally, the database arrangement 202 is communicably coupled to the processing module 204 using communication modules.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of managing a network of field-specific entity records, wherein the method comprises:
   a) accessing the network of field-specific entity records comprising at least one pair of field-specific entity records within at least one field segment, wherein each pair of the at least one pair of field-specific entity records is associated with relations between the pair of field-specific entity records, and wherein the at least one pair of field-specific entity records comprises a first pair of field-specific entity records and at least one second pair of field-specific entity records;
b) determining a weightage score of each of the relations in the at least one pair of field-specific entity records;
c) determining an importance score of each field-specific entity record in the at least one pair of field-specific entity records based on:
   a plurality of entity attributes of the field-specific entity record;
   relations of the field-specific entity record with other field-specific entity records in the at least one pair of field-specific entity records, wherein a number of the relations of the field-specific entity record is determined; and
   an aggregate of the number of the relations of the field-specific entity record and the weightage score of each of the relations between the field-specific entity record and other field-specific entity records in the at least one pair of field-specific entity records;
d) determining a change in at least one of:
   the importance score of a field-specific entity record of the first pair of field-specific entity records in the at least one field segment;
   the weightage score of a relation between the first pair of field-specific entity records in the at least one field segment;
e) determining a change in at least one of the importance score of a field-specific entity record and the weightage score of a relation between field-specific entity records of the at least one second pair of field-specific entity records, based on the determined change in the at least one of the importance score of the field-specific entity record and the weightage score of the relation between the field-specific entity records of the first pair of field-specific entity records; and
f) updating the network of field-specific entity records based on the determined change in:
   at least one of the importance score of the field-specific entity record and the weightage score of the relation between field-specific entity records of the first pair of field-specific entity records; and
   at least one of the importance score of the field-specific entity record and the weightage score of the relation between field-specific entity records of the at least one second pair of field-specific entity records.

2. The method of claim 1, wherein the method further comprises:
   obtaining field-specific entity records comprising an entity name and a plurality of entity attributes, wherein each of the field-specific entity records is associated with at least one field segment;
   identifying at least one pair of field-specific entity records having at least one similar entity attribute in each of at least one field segments; and
   generating the network of field-specific entity records by designating relations between the identified at least one pair of field-specific entity records.

3. The method of claim 2, wherein obtaining the field-specific entity records comprises developing a structured database by:
   crawling existing data sources to extract data-records;
   structuring the extracted data-records to obtain entity records, wherein each of the entity records comprises an entity name and a plurality of entity attributes;
   identifying a field of each of the entity records based on at least one of the plurality of entity attributes of the entity record; and
   segmenting the entity records into at least one field segment based on the field of the entity records, to identify field-specific entity records.

4. The method of claim 1, wherein the method further comprises receiving a user-input from a user, wherein the user-input is associated with the determined change in the at least one of the importance score of the field-specific entity record and the weightage score of the relation between the first pair of field-specific entity records.

5. The method of claim 1, wherein the method further comprises determining a net score of each field-specific entity record of the at least one pair of field-specific entity records based on:
   the importance score of each field-specific entity record of the at least one pair of field-specific entity records; and
   the weightage score of each of the relations between two field-specific entity records in the at least one pair of field-specific entity records.

6. The method of claim 5, wherein the method further comprises determining a change in the net score of each field-specific entity record of the at least one pair of field-specific entity records.

7. The method of claim 6, wherein the determined change in the net score is used to identify at least one of a positive growth and a negative growth of each field-specific entity record.

8. The method of claim 7, wherein the method further comprises determining an impact score of the network of field-specific entity records based on the determined change in the net score of each field-specific entity record.

9. A system for managing a network of field-specific entity records, wherein the system comprises:
   a processing module configured to:
   access the network of field-specific entity records comprising at least one pair of field-specific entity records within at least one field segment, wherein each pair of the at least one pair of field-specific entity records is associated with relations between the pair of field-specific entity records, and wherein the at least one pair of field-specific entity records comprises a first pair of field-specific entity records and at least one second pair of field-specific entity records;
   determine a weightage score of each of the relations in the at least one pair of field-specific entity records;
   determine an importance score of each field-specific entity record in the at least one pair of field-specific entity records based on:
   a plurality of entity attributes of the field-specific entity record;
   relations of the field-specific entity record with other field-specific entity records in the at least one pair of field-specific entity records,
   wherein a number of the relations of the field-specific entity record is determined; and
   an aggregate of the number of the relations of the field-specific entity record and the weightage score of each of the relations between the field-specific entity record and other field-specific entity records in the at least one pair of field-specific entity records;
   determine a change in at least one of:
   the importance score of a field-specific entity record of the first pair of field-specific entity records in the at least one field segment;

the weightage score of a relation between the first pair of field-specific entity records in the at least one field segment;

determine a change in at least one of the importance score of a field-specific entity record and the weightage score of a relation between field-specific entity records of the at least one second pair of field-specific entity records, based on the determined change in the at least one of the importance score of the field-specific entity record and the weightage score of the relation between the field-specific entity records of the first pair of field-specific entity records; and update the network of field-specific entity records based on the determined change in:
  at least one of the importance score of the field-specific entity record and the weightage score of the relation between field-specific entity records of the first pair of field-specific entity records; and
  at least one of the importance score of the field-specific entity record and the weightage score of the relation between field-specific entity records of the at least one second pair of field-specific entity records; and a database arrangement communicably coupled with the processing module, wherein the database arrangement is configured to store the network of field-specific entity records.

10. The system of claim 9, wherein the processing module is further configured to:
  obtain field-specific entity records comprising an entity name and a plurality of entity attributes, wherein each of the field-specific entity records is associated with at least one field segment;
  identify at least one pair of field-specific entity records having at least one similar entity attribute in each of at least one field segments; and
  generate the network of field-specific entity records by designating relations between the identified at least one pair of field-specific entity records.

11. The system of claim 10, wherein the processing module is further configured to develop a structured database by:
  crawling existing data sources to extract data-records;
  structuring the extracted data-records to obtain entity records, wherein each of the entity records comprises an entity name and a plurality of entity attributes;
  identifying a field of the entity records based on at least one of the plurality of entity attributes of the entity record; and
  segmenting the entity records into one or more field segments based on the field of the entity records, to identify field-specific entity records.

12. The system of claim 11, wherein the processing module comprises at least one crawler that is configured to extract entity records by crawling the existing data sources.

13. The system of claim 12, wherein the at least one crawler is implemented in a distributed architecture.

14. The system of claim 9, wherein the processing module is further configured to receive a user-input from a user, wherein the user-input is associated with the determined change in the at least one of the importance score of the field-specific entity record and the weightage score of the relation between the first pair of field-specific entity records.

15. The system of claim 9, wherein the processing module is further configured to determine a net score of each field-specific entity record of the at least one pair of field-specific entity records, based on:

the importance score of each field-specific entity record of the at least one pair of field-specific entity records; and
the weightage score of each of the relations between two field-specific entity records in the at least one pair of field-specific entity records.

16. The system of claim 9, wherein the processing module is further configured to determine a change in a net score of each field-specific entity record of the at least one pair of field-specific entity records.

17. The system of claim 16, wherein the processing module is further configured to use the determined change in the net score to identify at least one of a positive growth and a negative growth of each field-specific entity record.

18. The system of claim 17, wherein the processing module is further configured to determine an impact score of the network of field-specific entity records based on the determined change in the net score of each field-specific entity record.

19. A non-transitory readable medium, containing program instructions for execution on a computer system, which when executed by a computer, cause the computer to perform a method for managing a network of field-specific entity records, the method comprising the steps of:
  a) accessing the network of field-specific entity records comprising at least one pair of field-specific entity records within at least one field segment, wherein each pair of the at least one pair of field-specific entity records is associated with relations between the pair of field-specific entity records, and wherein the at least one pair of field-specific entity records comprises a first pair of field-specific entity records and at least one second pair of field-specific entity records;
  b) determining a weightage score of each of the relations in the at least one pair of field-specific entity records;
  c) determining an importance score of each field-specific entity record in the at least one pair of field-specific entity records based on:
    a plurality of entity attributes of the field-specific entity record;
    relations of the field-specific entity record with other field-specific entity records in the at least one pair of field-specific entity records,
    wherein a number of the relations of the field-specific entity record is determined; and
    an aggregate of the number of the relations of the field-specific entity record and the weightage score of the relations between the field-specific entity record and other field-specific entity records in the at least one pair of field-specific entity records;
  d) determining a change in at least one of:
  the importance score of a field-specific entity record of the first pair of field-specific entity records in the at least one field segment;
  the weightage score of a relation between the first pair of field-specific entity records in the at least one field segment;
  e) determining a change in at least one of the importance score of a field-specific entity record and the weightage score of a relation between field-specific entity records of the at least one second pair of field-specific entity records, based on the determined change in the at least one of the importance score of the field-specific entity record and the weightage score of the relation between the field-specific entity records of the first pair of field-specific entity records; and
  f) updating the network of field-specific entity records based on the determined change in:

at least one of the importance score of the field-specific entity record and the weightage score of the relation between field-specific entity records of the first pair of field-specific entity records; and at least one of the importance score of the field-specific entity record and the weightage score of the relation between field-specific entity records of the at least one second pair of field-specific entity records.

* * * * *